March 2, 1948.                J. W. HEINEY                2,437,158
                      YIELDABLE BOGIE SPRING MOUNTING
          Filed Feb. 7, 1944                        2 Sheets-Sheet 1

INVENTOR.
JOHN W. HEINEY
BY Hoguet, Neary & Campbell
his ATTORNEYS

INVENTOR
JOHN W. HEINEY
his ATTORNEYS

Patented Mar. 2, 1948

2,437,158

UNITED STATES PATENT OFFICE 2,437,158

YIELDABLE BOGIE SPRING MOUNTING

John W. Heiney, Allentown, Pa., assignor to Mack Manufacturing Corporation, New York, N. Y., a corporation of Delaware Application February 7, 1944, Serial No. 521,320

9 Claims. (Cl. 267—30)

1

My invention relates to flexible bogie vehicle spring mountings and to spring cushioning means which may be advantageously used in this and other vehicle mountings.

The present invention is concerned with a vehicle mounting which is particularly adapted to be used on heavy trucks, buses and other vehicles employing a rear four-wheel drive, to better enable these vehicles to carry a heavy load over rough roads or other terrain. My mounting has several particularly advantageous features. Its two driving axles are pivotally connected in such a manner that both its front and rear drive wheels may firmly grip the road even when a front wheel on one side of the vehicle is passing over a depression and the following rear wheel is passing over a high portion, while (disregarding for the moment all resilient action) at the same time moving the chassis vertically but one-half of the distance, either one of said two wheels is moved vertically from the normal road level more than the other. This of course means that when the higher portion and the depression extend the same distance from the normal surface the chassis frame remains on the same level insofar as this mounting is concerned.

Another advantageous feature provided by my mounting is that the axle spring ends are mounted in a cushion housing or casing having stop means whereby excessive flexing of the axle springs and the consequent abnormally large inward retraction of the spring ends are prevented from occurring. Experience has proven that any excessively large retraction of the spring end injures these cushioning blocks and that when these retractions repeatedly occur the blocks may be rendered inoperative.

The other and further purposes of my invention will become apparent as the specification proceeds.

Figure 1:
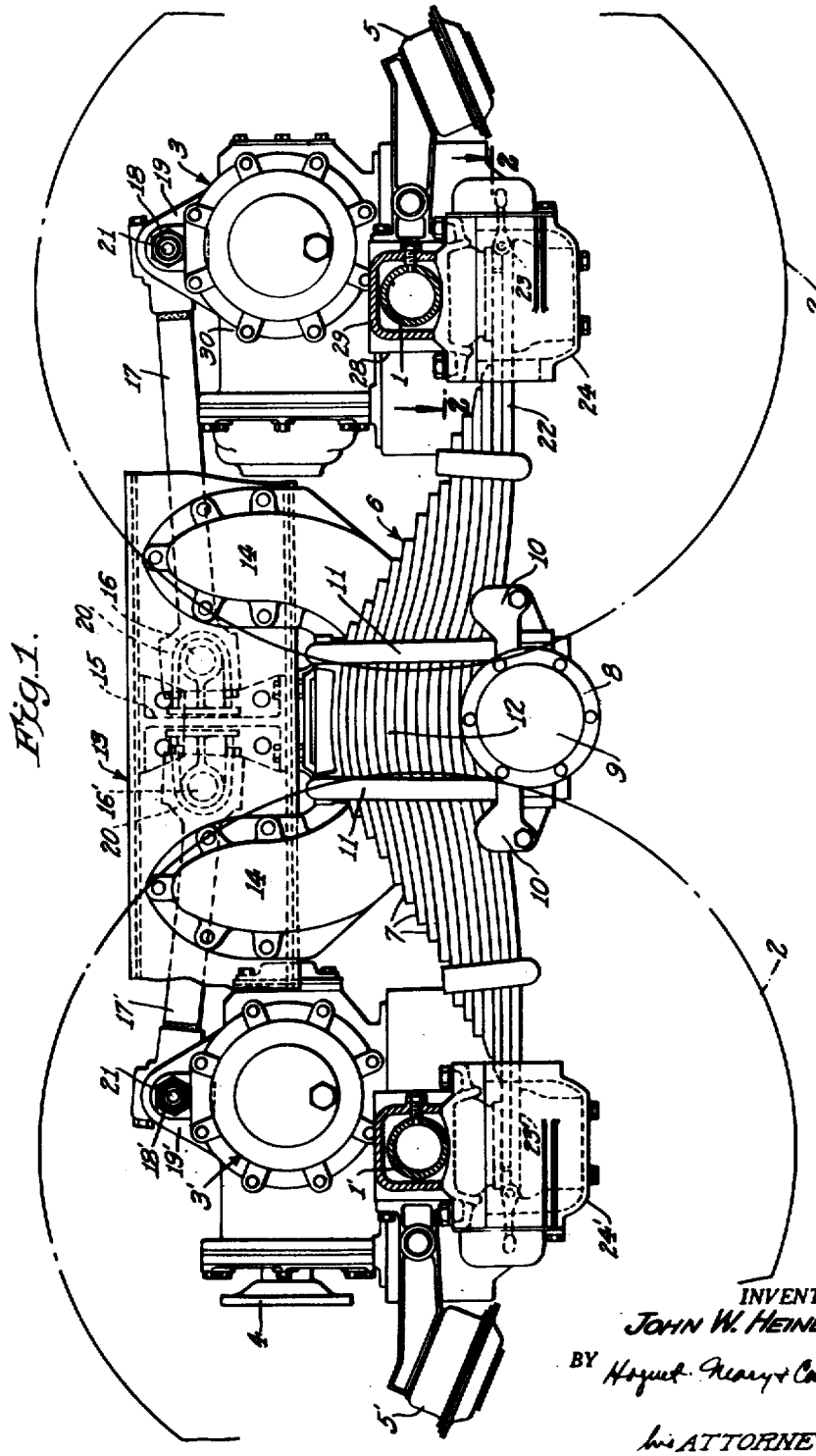
Fig. 1 shows a partly sectional side elevational view of a four-wheel bogie spring mounting embodying my invention.

While only a side view of the four-wheel yieldable spring mounting is shown in Fig. 1, it is to be understood that the opposite side of the mounting as viewed from that side is the counterpart, element for element, of the one shown. It is also to be understood that the front half and the rear half of the mounting are also counterparts of each other except that a shaft coupling is provided at the front end of the mounting whereby the mounting may be driven by the driving rod (not shown) of the vehicle.

This mounting carries a rear drive axle 1 for driving the rear wheels 2 and a front drive axle 1' for driving the front wheels 2'. The axles 1 and 1' are operatively connected to separate transmission units 3 and 3' respectively, which are connected together with a short shaft and universal joint means (not shown) in order that both transmission units may be driven by the vehicle driving rod or shaft (not shown) which is operatively secured to the mounting by means of a shaft coupling 4 extending from the front end of the mounting. If desired, suitable brake means 5 and 5' may be carried on the mounting substantially as shown. These brake means however form no novel part of my invention and therefore require no detailed description.

This mounting also makes use of two axle springs 6 (one not shown). Each of these springs include an assembly of spring leaves 7. The springs 6 are secured by means of a sleeve or journal 8 to opposite ends of a dead axle or shaft 9. One of these sleeves is rotatably secured to each end portion of this dead axle in a manner adapted to prevent longitudinal movement thereon. These sleeves are provided with perforated and oppositely extending ear portions 10 which, with the aid of threaded and bolted U-shaped clamp rods 11, tightly secure the spring to the dead axle by clamping the spring at its midportion 12 substantially as shown.

The dead axle 9 is fixedly and rigidly secured on each side of the chassis to a frame portion 13 by any suitable means such as by a U-plate 14 which may be bolted to the frame portion 13 substantially as shown. If desired, the dead axle may extend through these U-plates and be welded or otherwise secured thereto.

Here it may be noted that to the frame portion 13 is fixedly secured an abutment plate 15 which is positioned above the center line of the dead axle 9. A rearwardly extending journal 16 and a frontwardly extending journal 16' are mounted on opposite sides of this plate and serve to provide means whereby torque arms 17 and 17' respectively may be pivotally connected to this abutment plate. These arms 17 and 17' are connected at their outer ends to journal bearings 18 and 18' respectively which are mounted in perforated ears 19 and 19' carried by the transmission units 3 and 3'. These torque rods are provided at either end with suitable bearing portions 20 which may be pivotally connected by means of pins 21 substantially as shown. This torque arm connection prevents the two driving axles from turning or twisting horizontally beneath the chassis.

Referring again to Fig. 1, the bottom spring leaf 22 is longest and its forward end portion 23' extends into a forward cushion means 24' and its rear end portion 23 (see Figs. 2 and 3) extends into a rear cushioning means 24. The next to the bottom leaf 26 is only slightly shorter than the leaf 22 and extends into the cushioning means 24 and 24', respectively.

Figure 2:
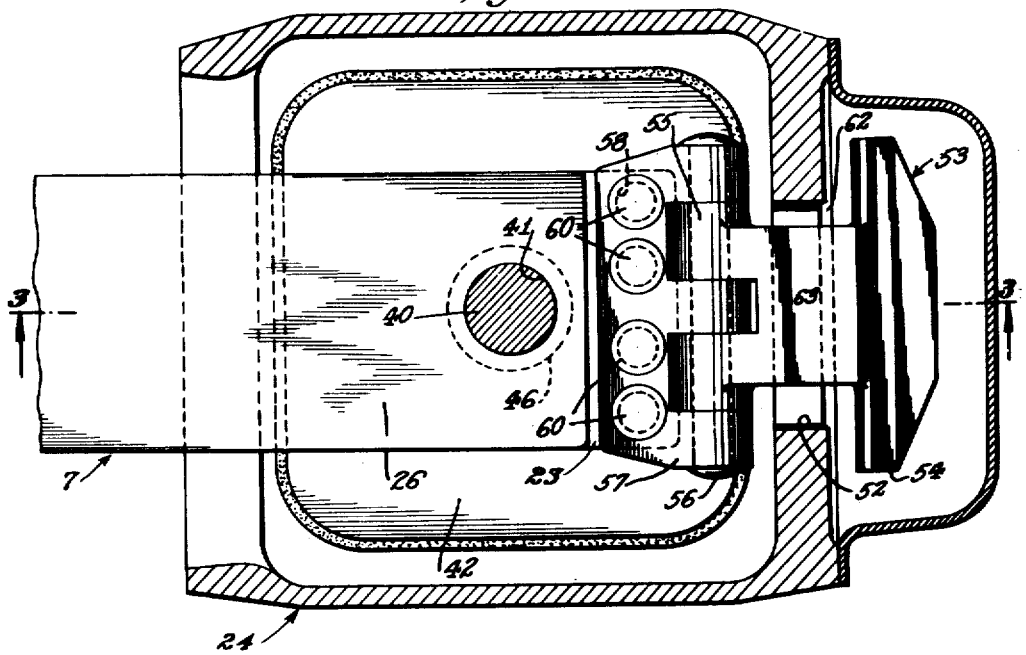
Fig. 2 is an enlarged section taken along the line 2—2 of Fig. 1.
Figure 3:
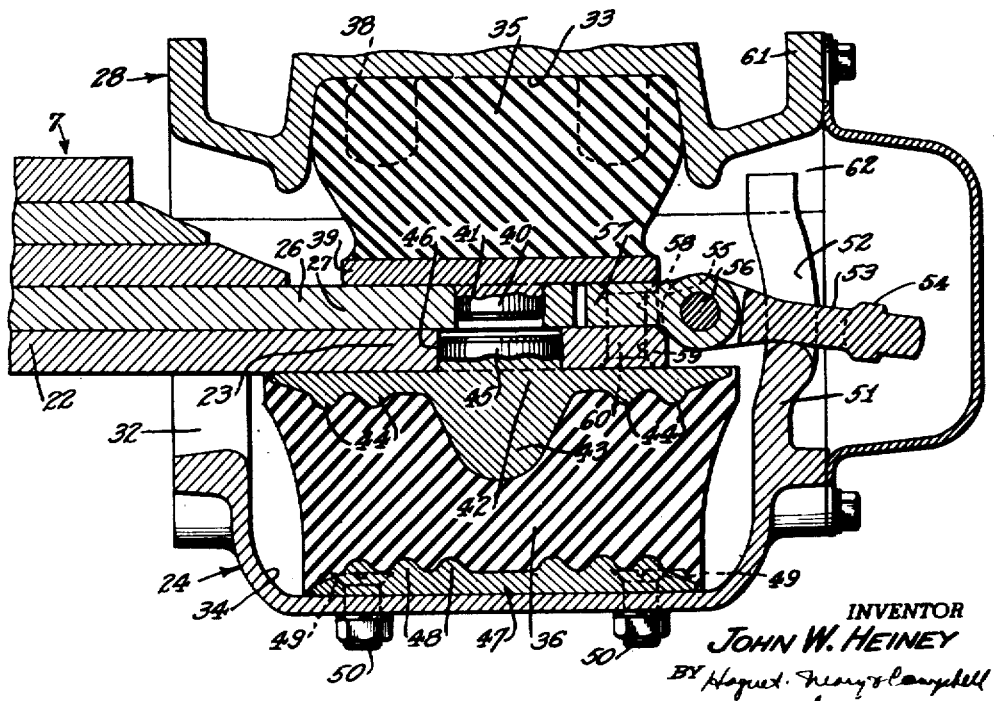
Fig. 3 is a section taken along the line 3—3 of Fig. 2.

As the front and the rear halves of the mounting are similarly constructed, let us now refer to Figs. 2 and 3 which show a larger and more detailed view of the rear cushioning means 24. This cushioning means has a casing 28 which may be, and preferably is, rigidly connected to the axle housing 29 and the casing 30 of the differential transmission unit 3. This casing 28 is formed with an opening 32 which is large enough to receive the adjacent end of the spring 7 and permit it to flex freely. In its interior the casing is provided with an upper recessed portion 33 and a lower recessed portion 34 adapted to receive an upper cushioning block 35 and a lower cushioning block 36, respectively.

These blocks 35 and 36 are formed of any suitable resilient material such as rubber or rubber-like materials. The upper block 35 is formed with recesses receiving downwardly extending metal lugs or bosses 38 which may be formed integral with the casing substantially as shown. The lower surface of this block 35 is also provided with a metal plate or shoe 39 to which it is preferably bonded.

This plate 39 carries a downwardly depending and preferably cylindrical boss 40 which extends into a circular opening 41 in the spring leaf 26 and provides means whereby, in the assembled position shown, the horizontal movement of its end portion 27 is resiliently restrained by the movement of the rubber block 35 and the plate 39.

The lower cushioning block 36 is preferably recessed at its upper portion and bonded to a metal shoe or plate 42, having on its lower side a large downwardly extending centrally positioned boss or dome portion 43 and a plurality of smaller bosses 44. The upper side of this plate is provided with an upwardly extending boss 45 which extends into an opening 46 provided in the bottom leaf spring end portion 23. Both the boss 45 and the opening 46 may be slightly larger than the boss 40 and the opening 41 in the leaf spring 26. The lower portion of the block 36 is recessed to snugly receive a base plate 47 provided with upwardly extending bosses 48 and a plurality of openings 49 adapted to receive screw bolts 50 whereby the plate may be bolted to the base of the casing substantially as shown.

At the end of the housing opposite the opening 32 there is provided an integral upwardly extending plate extension 51 provided with a slot 52. Through this slot extends a T-shaped bar 53 having a T or cross-piece 54 at its outer end and having a hinge portion 55 at its inner end which is hingedly connected by any suitable pin or bolt 56 to a complementary hinge member 57. This hinge member 57 secured to the end portion 23 of the spring 22 and the extreme end portion 23 of the spring leaf 22 are each provided with tapered openings 58 and 59, respectively, which receive pins 60 substantially as shown.

The hinge element 57 is preferably spaced sufficiently far from the end of the adjacent spring leaf 26 to prevent interference therewith during operation. It may also be noted that this hinge element 57 is preferably made of the same thickness as the leaf 26 in order to provide an even surface adjacent the plate 39.

The extreme end portion 61 of the casing 28 is provided with an opening 62 into which the shank 63 and cross piece 54 of the T-bar extend and in which the bar is free to move and swing up and down about the pin 56 as a pivot when the end of the spring leaf 22 is moving vertically and to a limited extent horizontally between the cushioning blocks 35 and 36. It should also be noted that the T-portion on the bar is spaced from the plate 51 preferably only slightly less than the distance the spring end portion may be moved without damaging the cushioning blocks 35 and 36.

The manner in which my mounting functions on the vehicle on which it is used should be well understood from the foregoing description.

As the bogie housing is only pivotally secured to the dead axle 9, it is free to rotate about this axle within wide limits beneath the chassis frame of the vehicle. The bogie wheels may therefore swing about this axle in a manner adapted to bear upon uneven portions of the road or traversed terrain even when these portions are substantially above or below the plane of the average or normal surface of that portion of the road or terrain then beneath the vehicle. The play of the spring is accommodated by the structure hereinabove described while exercising a control to prevent injury to the yielding spring connection. This control limits the longitudinal movement of the spring in the housing 24—28, as will be seen in Figs. 2 and 3, wherein it is to be noted that the inward movement of the end portion of the springs is definitely limited by the distance the T-bar must move before it strikes against and is stopped by the plate 51 of the casing 24, and that this distance can be and preferably is predetermined in the design of the mounting to prevent the spring end portion from being moved inwardly to such an extent as to damage the resilient blocks 35 and 36, without at the same time preventing the normal and desired spring action.

The foregoing spring structure, in addition to supporting the static load of the vehicle, serves as a distance and torque rod mechanism, thus eliminating the necessity of using a plurality of torque rods as is common in bogie structures of this general character. These torque rods have always been necessary in order to retain the axles in their proper relation and, of course, have had to be mounted parallel to and closely adjacent the spring. The yielding non-metallic blocks 35 and 36 form a part of the axle housing and afford sufficient retarding force to maintain the front and rear axles in proper alignment when driving on a straight away. In negotiating a sharp turn, the flexible spring mounting is sufficiently yielding to allow both axles to move with the turn. The resistance offered by the yieldable spring mounting is considerably less than that produced by the tire to road surface, thereby eliminating much of the tire scuffing characteristic of six-wheel bogie mechanisms.

The mechanism hereinabove described also serves as a torque insulator, allowing both front and rear axles to move slightly in either direction until the T-portion 53 makes positive contact, thus absorbing some of the shock load from the drive line to the gears and axle shafts. The underslung spring structure results in less hopping when the brakes are applied and a generally superior mechanism results.

It will, of course, be understood that the spring mounting embodying my invention is intended to be illustrative but not limiting. It is also to be understood that the resilient connection between the axle springs and the driving axles may be used with its stop means on other forms of spring mountings.

I claim:

1. A spring cushioning unit including a spring leaf, a hollow casing having an open portion receiving an end portion of said spring leaf, resilient cushioning means including oppositely spaced resilient block members mounted in said casing and receiving said end portion therebetween and connected to said casing, one of said block members being secured to said end portion, stop means within said casing located exteriorly of said block members, and stop means pivotally secured to said end portion and located exteriorly of said first-mentioned stop means, for limiting retraction of said leaf spring end portion from said casing.

2. A vehicle spring cushioning unit including two spring leaves, one mounted above the other, a hollow casing having an open portion receiving adjacent end portions of said leaves, two oppositely seated resilient block members secured in said casing face to face and receiving said end portions therebetween and secured thereto abutment means within said casing located exteriorly of said block members, and stop means pivotally secured to one of said end portions and adapted to limit the retraction of one of said spring end portions from said casing.

3. A vehicle spring cushioning unit including a spring leaf, a hollow casing having an open portion receiving an end portion of said spring leaf, two oppositely seated resilient cushioning members secured in said casing face to face and holding said end portion therebetween, and co-operating abutment means located exteriorly of said cushioning members on said casing and on said spring end portion, the abutment means of said spring end portion being pivotally secured to said end portion and located exteriorly of the abutment member in said casing, to limit the retraction of said end portion from said casing.

4. A vehicle spring cushioning unit including a spring leaf, a hollow casing having an open portion for receiving an end portion of said spring leaf, two oppositely seated resilient block members secured in said casing and receiving said end portions therebetween one of said block members being secured to said end portion, and two cooperating metal abutment means in said casing to limit the outward movement of said end portion through said open portion in said casing, one of said means forming part of said casing, the other of said means being pivotally secured to said end portion.

5. A vehicle spring cushioning unit including a spring leaf, a hollow casing having an open portion for receiving an end portion of said spring leaf, two oppositely seated resilient block members secured in said casing and receiving said end portion therebetween, a recessed abutment rigidly connected to said casing on the side of said blocks opposite said end portion and a metal bar pivotally secured to said end portion and extending through said recessed portion and provided with an abutting portion adapted to engage said recessed portion when the spring end portion is retracted in said casing a predetermined distance through the open portion of said casing.

6. A vehicle spring cushioning unit including a spring leaf, a hollow casing having an open portion for receiving an end portion of said spring leaf, two oppositely seated resilient block members secured in said casing and receiving said end portion therebetween, a recessed abutment rigidly connected to said casing on the side of said blocks opposite said end portion, a metal T-bar pivotally secured to said end portion having a shank portion extending through said recessed portion and being provided with an abutting portion adapted to engage said recessed portion when the spring end portion is retracted in said casing a predetermined distance through asid open portion.

7. A spring cushioning unit including a spring leaf, a hollow casing having an open side receiving an end portion of said spring leaf, cushioning means interposed between the opposite faces of said end portion and said casing and stop means for limiting the retraction of said end portion from said casing under load comprising a T-shaped element connected to and projecting beyond the free end of said spring end portion and an element on said casing receiving the shank of said T-shaped element and cooperating with the head of said T-shaped element.

8. A spring cushioning unit including a spring leaf, a hollow casing having an open side receiving an end portion of said spring leaf, cushioning means interposed between the opposite faces of said end portion and said casing and stop means for limiting the retraction of said end portion from said casing comprising a T-shaped element pivotally connected to the free end of said end portion by means of a pivot extending in the direction of the width of said spring leaf and a stop member on said casing provided with a slot extending at right angles to said pivot and receiving the shank of said T-shaped element and of less width than the head of said T-shaped element.

9. A spring cushioning unit including a spring leaf, a hollow casing having an open side receiving an end portion of said spring leaf, cushioning means interposed between the opposite faces of said end portion and said casing and stop means for limiting the retraction of said end portion from said casing comprising a T-shaped element pivotally connected to the free end of said end portion by means of a pivot extending in the direction of the width of said spring leaf and a stop member on said casing provided with a slot extending at right angles to said pivot and receiving the shank of said T-shaped element and of less width than the head of said T-shaped element, the face on the stop member cooperating with the head of said T-shaped element being arcuate about an axis located on the opposite side of said stop member.

JOHN W. HEINEY.

(References on following page)

REFERENCES CITED

The following references are of record in the file of this patent:

UNITED STATES PATENTS

| Number | Name | Date |
|---|---|---|
| 1,226,434 | Zumwalt | May 15, 1917 |
| 1,463,655 | Masury et al. | July 31, 1923 |
| 1,472,371 | Masury et al. | Oct. 30, 1923 |
| 1,484,954 | Masury | Feb. 26, 1924 |
| 1,496,237 | Leipert | June 3, 1924 |
| 1,566,026 | Leipert et al. | Dec. 15, 1925 |
| 1,792,038 | Rossi | Feb. 10, 1931 |
| 1,861,053 | Dykstra | May 31, 1932 |
| 1,947,358 | Rayburn | Feb. 13, 1934 |
| 2,284,646 | Eidal | June 2, 1942 |

FOREIGN PATENTS

| Number | Country | Date |
|---|---|---|
| 1,421 | Great Britain | 1913 |
| 142,605 | Great Britain | May 13, 1920 |

Certificate of Correction

Patent No. 2,437,158.                                           March 2, 1948.

JOHN W. HEINEY

It is hereby certified that errors appear in the printed specification of the above numbered patent requiring correction as follows: Column 4, line 3, after the numeral "57" and before the period insert , *secured to the end portion 23 of the spring 22*; lines 4 and 5, same column, strike out "secured to the end portion 23 of the spring 22"; column 6, line 26, claim 6, for "asid" read *said*; and that the said Letters Patent should be read with these corrections therein that the same may conform to the record of the case in the Patent Office.

Signed and sealed this 4th day of May, A. D. 1948.

[SEAL]

THOMAS F. MURPHY,
*Assistant Commissioner of Patents.*

REFERENCES CITED

The following references are of record in the file of this patent:

UNITED STATES PATENTS

| Number | Name | Date |
|---|---|---|
| 1,226,434 | Zumwalt | May 15, 1917 |
| 1,463,655 | Masury et al. | July 31, 1923 |
| 1,472,371 | Masury et al. | Oct. 30, 1923 |
| 1,484,954 | Masury | Feb. 26, 1924 |
| 1,496,237 | Leipert | June 3, 1924 |
| 1,566,026 | Leipert et al. | Dec. 15, 1925 |
| 1,792,038 | Rossi | Feb. 10, 1931 |
| 1,861,053 | Dykstra | May 31, 1932 |
| 1,947,358 | Rayburn | Feb. 13, 1934 |
| 2,284,646 | Eidal | June 2, 1942 |

FOREIGN PATENTS

| Number | Country | Date |
|---|---|---|
| 1,421 | Great Britain | 1913 |
| 142,605 | Great Britain | May 13, 1920 |

Certificate of Correction

Patent No. 2,437,158.  March 2, 1948.

JOHN W. HEINEY

It is hereby certified that errors appear in the printed specification of the above numbered patent requiring correction as follows: Column 4, line 3, after the numeral "57" and before the period insert , *secured to the end portion 23 of the spring 22*; lines 4 and 5, same column, strike out "secured to the end portion 23 of the spring 22"; column 6, line 26, claim 6, for "asid" read *said*; and that the said Letters Patent should be read with these corrections therein that the same may conform to the record of the case in the Patent Office.

Signed and sealed this 4th day of May, A. D. 1948.

[SEAL]

THOMAS F. MURPHY,
*Assistant Commissioner of Patents.*